United States Patent [19]
Borner

[11] Patent Number: 5,881,863
[45] Date of Patent: Mar. 16, 1999

[54] CONVEYOR BELT AND LACING SYSTEM THEREFOR

[75] Inventor: Gerhard Borner, Wiesbaden, Germany

[73] Assignee: Mato Maschinen-und Metallwarenfabrik Curt Matthaei GmbH & Co. KG, Germany

[21] Appl. No.: 703,667

[22] Filed: Aug. 27, 1996

[30] Foreign Application Priority Data

Aug. 27, 1995 [DE] Germany .................. 195 31 432.8

[51] Int. Cl.$^6$ .................................................. B65G 17/38
[52] U.S. Cl. .................... 198/844.2; 24/33 P; 24/33 R
[58] Field of Search .................... 198/818, 821, 198/824, 844.2; 24/33 P, 33 C, 33 R, 31 R

[56] References Cited

U.S. PATENT DOCUMENTS

| 3,176,358 | 4/1965 | Leflon . | |
|---|---|---|---|
| 4,212,094 | 7/1980 | Pray | 24/33 P X |
| 4,641,398 | 2/1987 | Schick | 24/33 R |
| 4,671,403 | 6/1987 | Schick | 198/844.2 |
| 5,467,867 | 11/1995 | Musil et al. | 198/844.2 |

FOREIGN PATENT DOCUMENTS

| 2940522 | 5/1984 | Germany . |
|---|---|---|
| 3709594 | 7/1988 | Germany . |

*Primary Examiner*—James R. Bidwell
*Attorney, Agent, or Firm*—Price, Heneveld, Cooper, DeWitt & Litton

[57] ABSTRACT

A belt lacing is provided for conveyor belts of the type used in installations with a trough zone, where the conveyor belt is supported on both sides curved towards the top. The conveyor belt ends are joined together with a hinge joint or lacing, which is exclusively located outside of the curved sections of the trough zone of the conveyor belt. The hinge joint or lacing contains coupling eyes which are fastened to the conveyor belt and at least one connecting pin, which passes through the intermeshing coupling eyes. The conveyor belt excels because of the minor wear in laterally flexing transition areas of the conveyor belt during passage through the trough zone. Moreover, it is simply constructed and can be manufactured in an uncomplicated way.

31 Claims, 5 Drawing Sheets

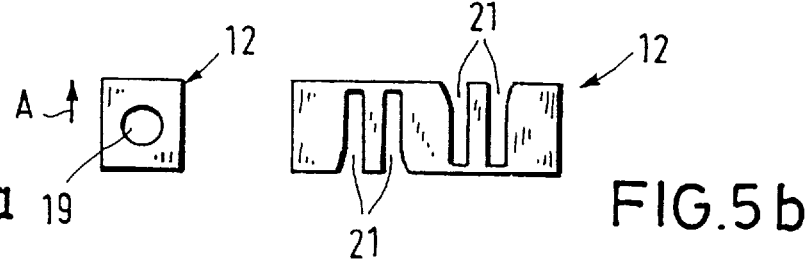
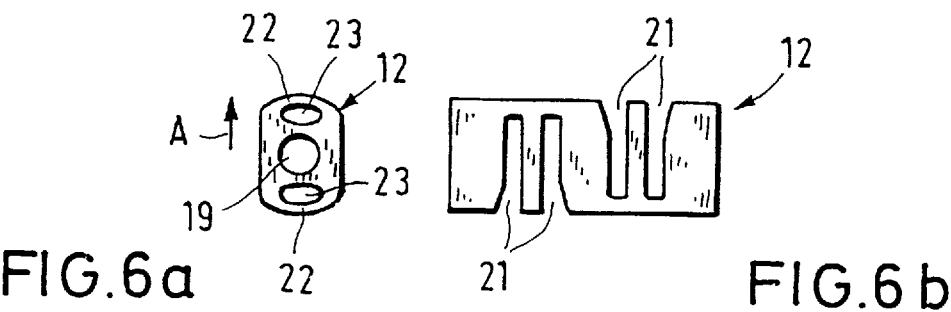
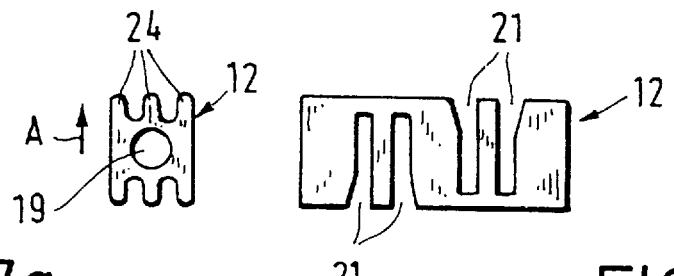

CONVEYOR BELT AND LACING SYSTEM THEREFOR

BACKGROUND OF INVENTION

The invention pertains to a conveyor belt for use in a conveyor installation with a trough zone or the like, wherein the opposite sides of the conveyor belt are supported in an upwardly extending fashion by rollers or the like. The conveyor belt ends are connected to one another with a hinge joint or lacing, which consists of coupling eyes fastened to the conveyor belt ends, and at least one coupling rod or pin passing through associated coupling eyes, which are arranged in intermeshing order.

Conveyor belts for use in conveyor installations with a trough zone are well-known in the art, as exemplified in U.S. Pat. No. 3,175,358. In such installations, the coupling rod is formed in a one-piece construction, and the coupling eyes are fastened to each end of the conveyor belt, in closely spaced intervals, and extend along the entire width of the conveyor belt. A flexible coupling rod passes through the intermeshing coupling eyes of both conveyor belt ends. Starting from the drive pulley of the conveyor belt at the beginning of the conveyor installation, where the conveyor belt is essentially level, the conveyor belt then proceeds through a "trough zone" where the belt is forced into a laterally cupped or curved configuration by supporting rollers on both sides of the conveyor belt. The curvature of the conveyor belt is on a plane perpendicular to the transport direction of the conveyor belt, and is rendered possible because of the lateral flexibility of the coupling rod, and the clearance distance between adjacent coupling eyes.

The disadvantage of current conveyor belt designs is that the hinge joint or lacing in the curved or cupped area of the splice is exposed to increased wear, which significantly decreases the performance time of the lacing and associated conveyor belt. Also, in the cupped or curved section of the conveyor belt, the intermeshed pairs of coupling eyes, which form the splice, bend over and jam against each other, which tends to lead to even greater wear problems. It is easy to see that in the sides of the cupped section of the trough zone, where the conveyor belt is not directly supported, and where the rollers are set up in an obtuse angle, the conveyor belt, and thus also the hinge joint, are noticeably compressed into the space between the support rollers, because of the way the weight of the transported goods acts upon the conveyor belt and causes the pairs of fasteners to jam and bend even more.

SUMMARY OF INVENTION

It is the objective of the present invention to further develop a belt lacing system and conveyor belt designed for use in the trough zone of a conveyor installation, in such a manner, that it experiences only insignificant wear during passage through the trough zone in the curvature area, and thus achieves a higher performance time and longer wear life. Also, the connection of the two conveyor belt ends is relatively uncomplicated in construction and uncomplicated in manufacturing.

An objective of the present invention is to provide a conveyor design and associated method for use in conveyor installations of the type having a trough zone, wherein the hinge joint or lacing is situated exclusively in that portion of the trough area of the conveyor belt which is not curved, thus the invention proposes to do without belt fasteners in that area of the conveyor belt which during operation experiences the greatest lateral flexure. As a consequence, reduced wear is experienced in this area. In this context, it is to be noted that during operation, the conveyor belt changes the alignment of its lengthwise direction somewhat, especially under conditions when the belt is unevenly loaded, for instance with stones, rocks, or the like. Since during such operation of the conveyor belt, this lateral or side-to-side motion cannot be avoided, according to the present invention, belt fasteners should not be located on the conveyor belt where there might be a danger of that a segment of belt fasteners on the conveyor belt would experience significant flexure during this lateral or side-to-side motion of the conveyor belt.

In a preferred embodiment of the present invention, the conveyor belt is bent twice in the trough area, and the lacing or hinge joint is constructed in a three-part arrangement. One set of rollers support the conveyor belt horizontally, while two further sets of rollers are arranged in opposite obtuse angles to the first set of rollers, and support the conveyor belt on both side sections.

The essential task of the coupling rod or pin in the hinge joint is to transfer the pull of one conveyor belt end to the other conveyor belt end. The coupling rod is thus mainly subjected to shear force. Consequently, the coupling rod can be essentially shaped as a substantially rigid component, or as a flexible component, for instance as a cable of defined thickness which is suitable for transferring these shear forces. It is also conceivable to use a cable of smaller dimension which is fitted with a shell-like housing or casing. The coupling rod or pin has to be of a laterally flexible construction, at least in those applications where the coupling rod extends across the total width of the conveyor belt. However, it is possible to use several rigid coupling rods, where, in that case, each coupling rod passes through the coupling eyes of an associated linear segment of the hinge joint or lacing. Each such rigid coupling rod is located only in that area of the conveyor belt which does not experience lateral flexure during passage through the trough zone of the conveyor.

According to one aspect of the invention, a sealing element is inserted between adjacent hinge joint segments to form a slit free joint. This effectively prevents transported material of smaller size from passing through the openings that form between adjacent hinge joint segments at the two conveyor belt ends.

Since the noted sealing element does not have to transfer any forces, especially not pull forces, between the conveyor belt ends, and only has a sealing function, it is sufficient to fasten the sealing element with rigid fastening elements, with each fastening element being linked to both conveyor belt ends. In this arrangement, there is at least one fastening element located on each side of the conveyor belt end, while the fastening elements secure an associated sealing element between each other. In one embodiment of the present invention, the fastening elements are shaped as plates which extend from one end of the conveyor belt end to the other, and are fastened to them both, wherein the sealing element is captured between the fastening elements. In case a flexible coupling rod passes through the hinge joint components, the sealing element has a passage duct or opening for holding the coupling rod.

When using a flexible coupling rod, an alternate embodiment of the present invention provides for the sealing element to be held with at least one mounting eye and with the flexible coupling rod. The mounting eye is fastened to the conveyor belt end, and the coupling rod passes through the mounting eye and through the longitudinal passage of the sealing element. In one example, the mounting of the sealing element can be accomplished with a single mounting eye and the coupling rod, where, for instance, this mounting eye is shaped similar to a coupling eye of the hinge joint or lacing. However, the coupling eye of the belt fastener actually serves to transfer forces, while the mounting eye that mounts the sealing element does not interact directly or mesh with another mounting eye. But it is advantageous, when one mounting eye is fastened to one conveyor belt end, and the other mounting eye is fastened to the other conveyor belt end, both mounting eyes grasp the opposite sides of the sealing element. Since the coupling rod passes through the center of the sealing element, it is considered advantageous if the mounting eye is held in at least one recess in the sealing element, and this detention ought to occur essentially without play along the longitudinal direction of the passage opening. If one mounting eye is fastened to one conveyor belt end, and the other mounting eye is fastened to the other conveyor belt end, the one mounting eye settles into the recess or recesses of one side of the sealing element and the other mounting eye settles into the recess or recesses on the opposite side of the sealing element.

The sealing elements can be shaped in many different forms. Advantageous is a plate-shaped form.

A preferred model finally provides for the sides of the sealing element facing the conveyor belt ends to be elastic. This design is based upon the knowledge that the gap between the conveyor belt ends in the section of the sealing element changes in accordance with the pull forces transferred by the conveyor belt. If the gap widens, this can be compensated for by the elastic construction of the sealing element, so that the seal in the area between the hinge joint, and between the conveyor belt ends, is ensured in all operational conditions of the conveyor belt.

Further characteristics of the invention are represented in the description of the figures and by the figures themselves. The following is a closer explanation of the invention through several example embodiments, which are illustrated in the drawing without being limited to it.

BRIEF DESCRIPTION OF THE DRAWINGS

FIG. 5a is a modified sealing element, shown from the side thereof.

FIG. 5b is a top view of the sealing element shown in FIG. 5a.

FIGS. 6a and 6b are top and side views of a modified sealing element.

FIGS. 7a and 7b are top and side views of a further modified sealing element.

DETAILED DESCRIPTION OF THE PREFERRED EMBODIMENTS

Figure 1:
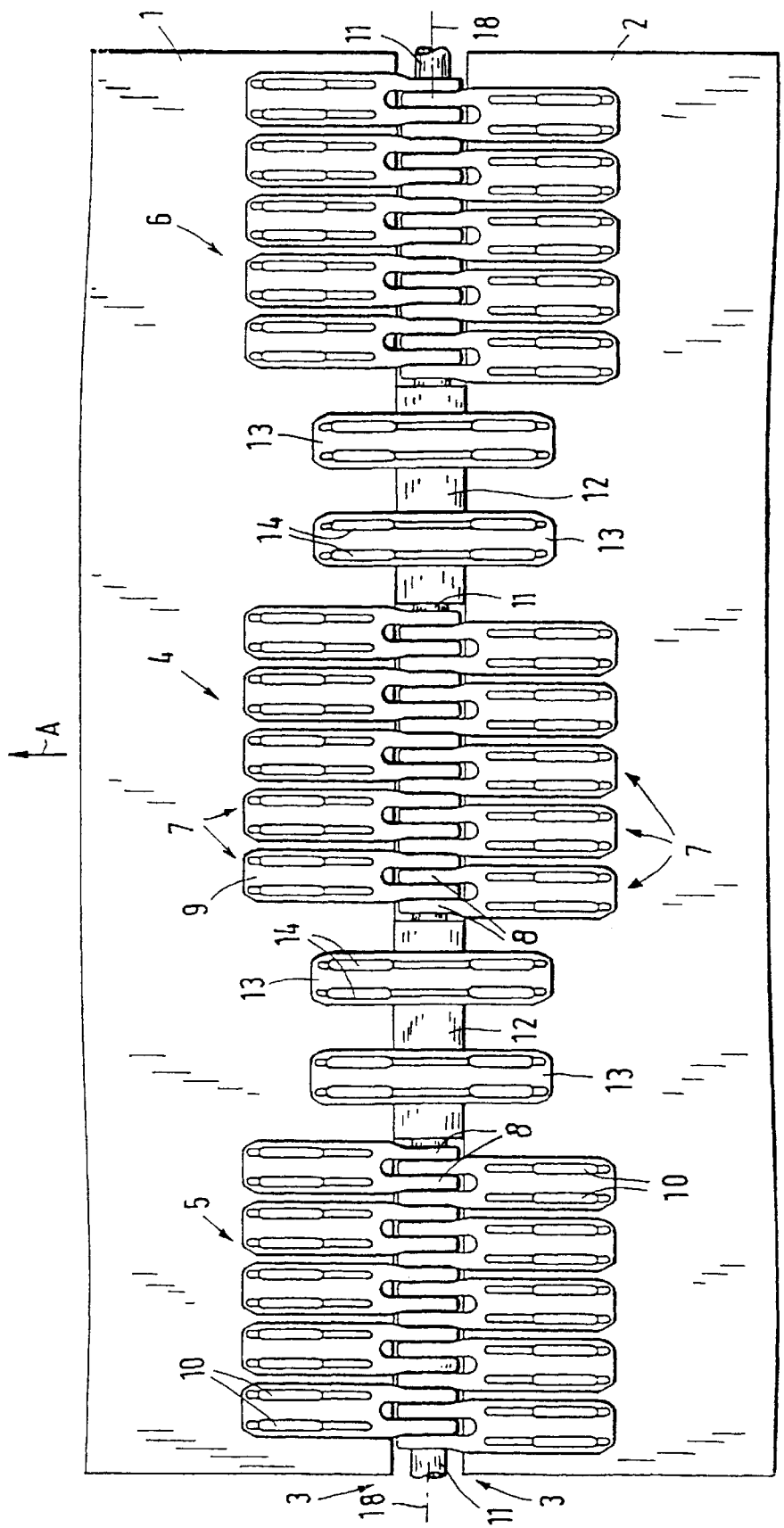
FIG. 1 is a conveyor belt with fastening system according to the invention, illustrated in top view in the connection area of the two conveyor belt ends, shown in a flat condition.
Figure 2:
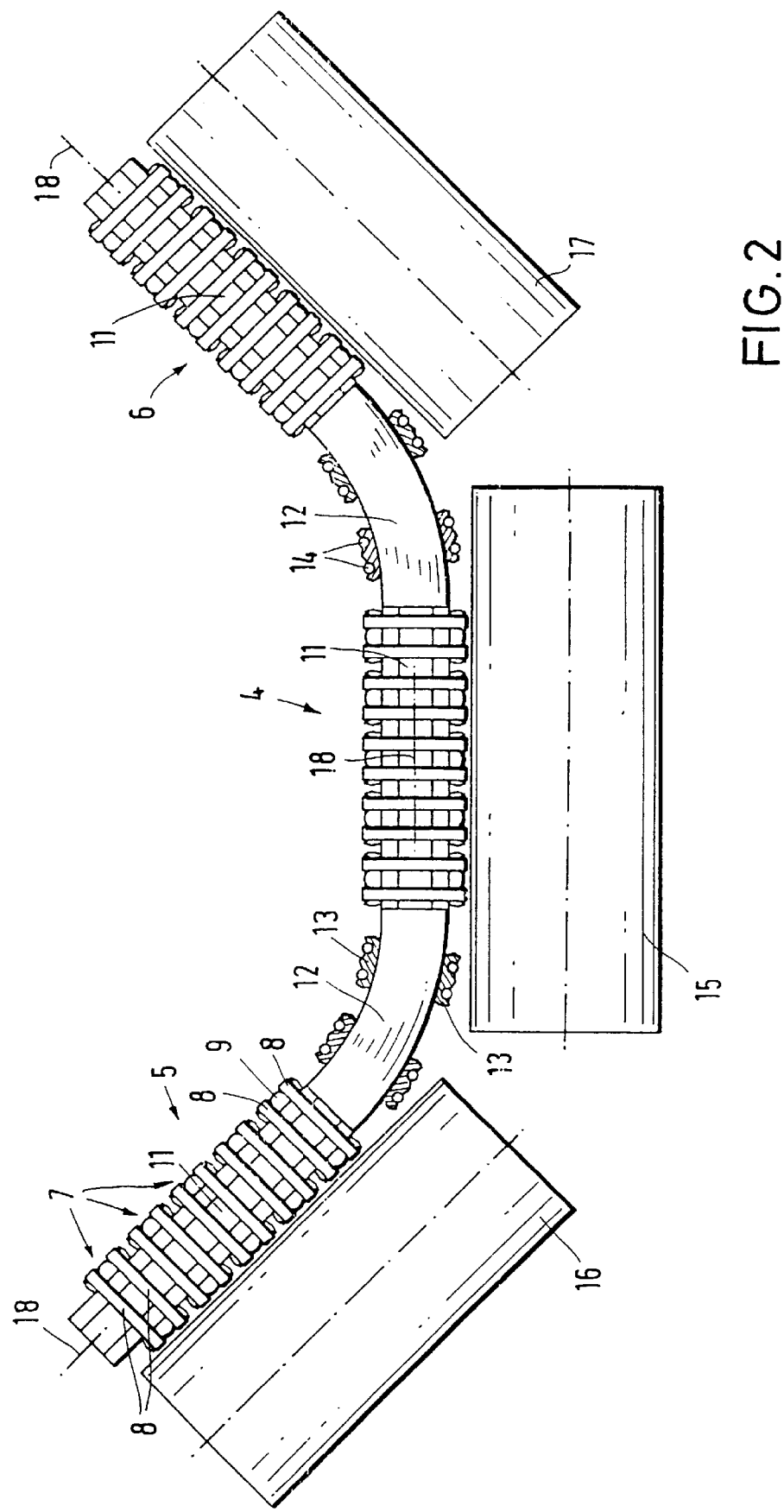
FIG. 2 is a frontal view of the conveyor belt shown in FIG. 1, shown during passage through the trough zone.
Figure 3:
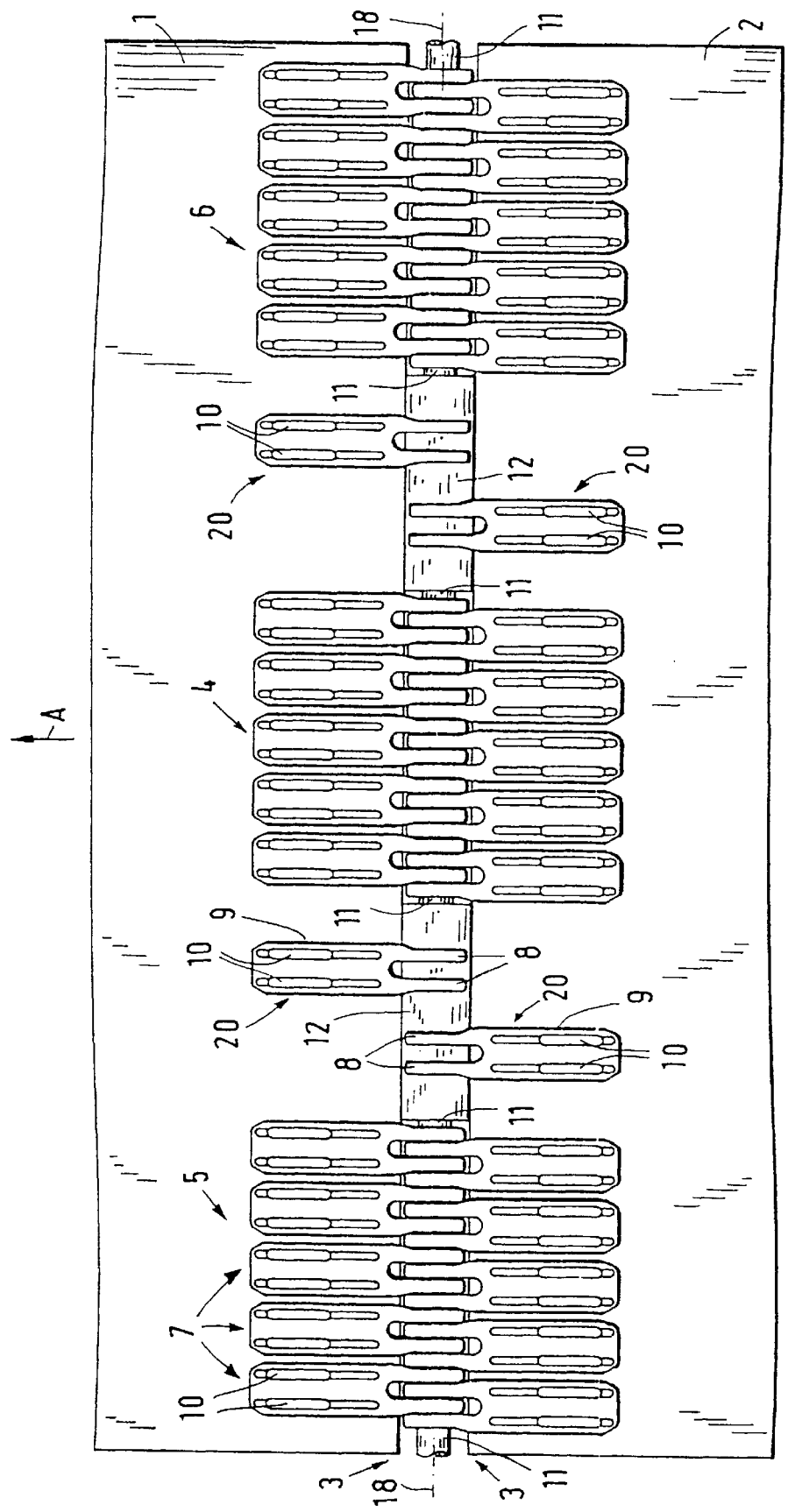
FIG. 3 is the conveyor belt, with an alternate fastening system according to the invention illustrated in top view in the connection area of the two conveyor belt ends, shown in a flat condition.
Figure 4:
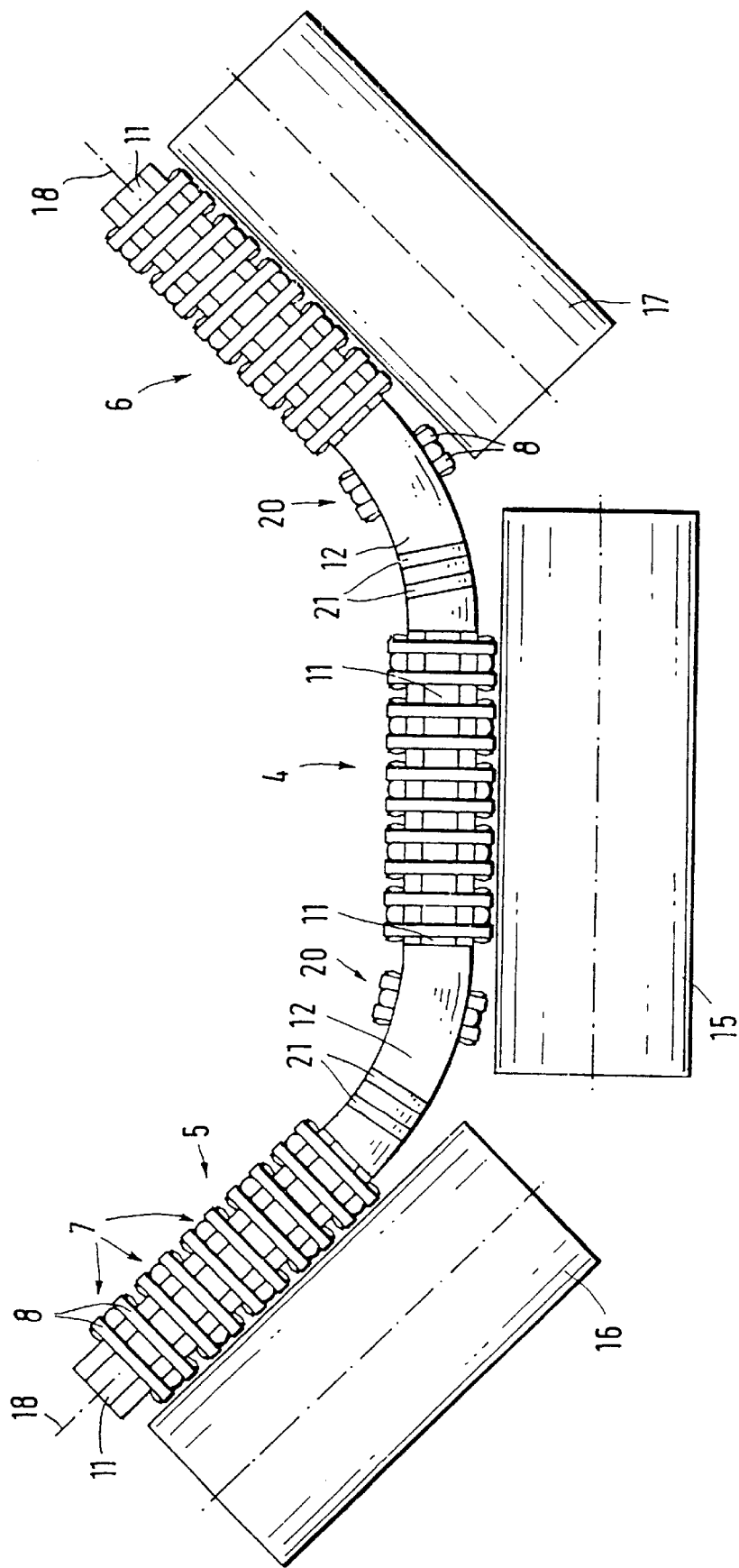
FIG. 4 is a frontal view of the conveyor belt shown in FIG. 3, shown during passage through the trough zone.

With reference to FIGS. 1 and 2, the illustrated conveyor belt 3 is of the type used in installations having a cupped-shaped trough zone (FIG. 2), wherein a center portion of the belt 3 is generally flat and supported in a normally horizontal orientation, at least one side portion of said belt is deformed upwardly from the center portion and supported in a normally vertically inclined orientation, and a transition portion of the belt 3 (disposed between said center portion and said one side portion) is generally arcuate and unsupported. The present belt lacing system hingedly interconnects the opposite ends (1 and 2) of the belt 3 in a manner which permits the belt 3 to flex readily through the trough zone. A first set of belt fasteners 4 is connected to the opposite ends of the belt 3, and is arranged side-by-side along the center portion of belt 3. A second set of belt fasteners 5 or 6 is connected to the opposite ends of the belt 3, and is arranged side-by-side along an associated side portion of belt 3. At least one connecting pin 11 extends through intermeshed eyes 8 on the first set of belt fasteners and the second set of belt fasteners to hingedly interconnect the belt fasteners on the center and the associated side portion of the belt 3. The opposite ends 1 and 2 of the belt 3 are without means for structurally interconnecting the same along the transition portion of the belt 3 to facilitate free lateral flexure of the belt 3 through the trough zone.

FIG. 1 shows the two conveyor belt ends 1 and 2 joined together by a mechanical belt lacing system embodying the present invention. Relative to the transportation direction "A", the conveyor belt 3 contains at its middle section a hinge joint segment or component 4, and at each side section a hinge joint segment or component 5 and 6. The hinge joint segments 4–6 are substantially identical. In the example illustrated in FIGS. 1 and 2, each hinge joint segment consists of ten individual fastening elements 7, wherein five of the fastening elements 7 are fastened to the one conveyor belt end 1, and the other five fastening elements 7 are fastened to the other conveyor belt end 2, and positioned so that they intermesh with one another. Each of the fastening elements 7 has two, U-shaped coupling eyes 8, arranged parallel to each other, as well as two fastening legs 9, arranged parallel to each other, which extend integrally into the two coupling eyes 8. The fastening legs 9 are plate-shaped, and secure the particular conveyor belt end 1 or 2 between each other. Each fastening leg 9 contains four holes or apertures, which are mutually aligned with one another. Fasteners, such as the illustrated staples 10 pass their legs through the holes in fastener legs 9, and through the carcass of conveyor belt 3. Each staple 10 is bent over or crimped at its free end to ensure secure attachment of each fastening element 7 to the corresponding conveyor belt end 1 and 2. The fastening elements 7 of each hinge joint segment 4, 5, and 6 is arranged in relatively close side-by-side proximity to one another. A coupling rod or pin 11 is inserted through the intermeshed coupling eyes 8 of each corresponding hinge joint segment 4, 5, and 6, and thus defines a linkage axis 18 about which the belt ends 1 and 2 can pivot with respect to each other.

Between adjacent hinge joint segments 4 & 5, and 4 & 6, a plate-shaped sealing element 12 is inserted between the two conveyor belt ends 1 and 2, with its ends at a close distance from the adjacent fastening elements 7 of the hinge joint segments 4 & 5, and 4 & 6. Each sealing element 12 is fastened in place by fasteners in the nature of two rigid plates 13, positioned on each side of the conveyor belt 3. The two fastener plates 13 are fastened parallel to one another, and have four holes each for accommodating further staples 14, which pass through the conveyor belt ends 1 and 2 on both sides of the sealing element 12. Relative to the transport direction "A", the length of each individual plate 13 is roughly the same size, or slightly larger than the length of a single fastening element 7.

FIG. 2 represents the arrangement of conveyor belt 3 when passing through the trough zone of the conveyor installation, according to the invention. Shown is only the conveyor belt end 1 running in transport direction "A" with the attached fastening elements 7. The belt lacing system shown in FIG. 2 also includes the two sealing elements 12, and the plates 13 for fastening the sealing elements to the conveyor belt end 1, as well as the coupling rod or pin 11. FIG. 2 shows that the middle hinge joint segment 4 is supported by a middle roller 15, which is rotatable along its horizontal axis. Two more rollers 16 and 17 are located at an obtuse angle to the roller 15 on opposite sides thereof. In the illustrated example of FIG. 2, the conveyor belt 3 is curved or arcuate in shape between hinge joint segments 4 and 5, and 4 and 6, as the conveyor belt 3 is not directly supported in these areas.

The embodiments of the present invention shown in FIGS. 3 to 7b differ from the belt fastener system illustrated in FIGS. 1 and 2 only in the form, location, and fastening of the sealing elements 12. For simplicity sake, identical parts corresponding to the embodiment shown in FIGS. 1 and 2 are identified with the same reference numbers in the subsequent figures.

With references to FIGS. 5a and 5b, the illustrated sealing element 12 has a quadrilateral transverse cross-sectional shape, and contains a central passage duct or opening 19, through which a longitudinally flexible coupling rod or pin 11 passes. The sealing element 12 shown in FIGS. 5a and 5b is retained in place in the splice shown in FIGS. 3 and 4 by the coupling rod 11, and by two mounting eyes 20, where both mounting eyes 20 are shaped identically, and are similar to the previously described fastening elements 7, such that the sealing element 12 is also fastened to the corresponding conveyor belt ends 1 and 2. As can be seen in FIG. 5b, the sealing element 12 has two slot-shaped recesses 21 on opposite sides thereof, which are parallel to one another, and into which are inserted the U-shaped eye sections 8 of the mounting eye 20 (FIGS. 3 and 4), so that, after the mounting eyes 20 of the corresponding sealing element 12 are fastened in sideways alignment to the conveyor belt ends 1 and 2, in the recesses 21 of the sealing element 12, the flexible coupling rod or pin 11 can be inserted through the eyes 8 of fastening elements 7, the opening 19 in sealing element 12, and the mounting eyes 20 to pivotally link the conveyor belt ends 1 and 2.

FIGS. 5a, 6a, and 7a indicate with the arrow "A" the pull or transport direction of the conveyor belt 3, and disclose in FIGS. 6a and 7a alternate embodiments of the sealing element 12 which have different cross-sectional shapes. In FIG. 6a, the elastic sealing element 12 has opposite side sections 22 curved to the outside, and which have corresponding passage ducts or openings 23 parallel to the passage opening 19. Without a load on the conveyor band, the conveyor belt ends 1 and 2 are closer together, and the sealing element 12 is tightly compressed, so that the passage openings 23 are closed. When the conveyor belt 1 is loaded, the conveyor belt ends 1 and 2 move away from one another, and the sealing element 12 expands to fill in for the relative movement of the conveyor belt ends because of its elastic capability. To attain the same result, an alternative type of sealing element 12 is shown in FIG. 7, which contains a number of sealing lips 24 extending in the direction of the arrow "A". Sealing lips 24 extend along the whole width of the sealing element 12, and compress when the conveyor belt 1 is relatively empty, and expand or lengthen, when the conveyor belt 1 is loaded, so as to remain pressed tightly against the faces of the corresponding conveyor belt ends 1 and 2 for improved sealing effect.

The embodiments of the invention in which an exclusive property or privilege is claimed are as follows:

1. In a conveyor belt of the type used in installations having a cupped-shaped trough zone, wherein a center portion of said belt is generally flat and supported in a normally horizontal orientation, at least one side portion of said belt is deformed upwardly from said center portion and supported in a normally vertically inclined orientation, and a transition portion of said belt, disposed between said center portion and said one side portion, is generally arcuate and unsupported, the improvement of a belt lacing system hingedly interconnecting opposite ends of said belt in a manner which permits said belt to flex readily through the trough zone, comprising:

a first set of belt fasteners connected to the opposite ends of said belt, and arranged side-by-side along said center portion thereof; said first set of belt fasteners having intermeshed eyes;

a second set of belt fasteners connected to the opposite ends of said conveyor belt, and arranged side-by-side along said side portion thereof; said second set of belt fasteners having intermeshed eyes;

at least one connecting pin extending through the eyes of said first set of belt fasteners and said second set of belt fasteners to hingedly interconnect said belt fasteners on said center and side portions of said belt; and said opposite ends of said belt being without means for structurally interconnecting the same along said transition portion to facilitate free lateral flexure of said belt through the trough zone.

2. A conveyor belt as set forth in claim 1, wherein:

said belt includes first and second side portions deformed upwardly from opposite sides of said center portion and supported in a normally vertically inclined orientation, and first and second transition portions disposed between said center portion and said first and second side portions respectively, each of which are generally arcuate and unsupported;

said first set of belt fasteners is positioned on the first side portion of said belt; and including a third set of belt fasteners connected to the opposite ends of said belt, and arranged side-by-side along said second side portion thereof; said third set of belt fasteners having intermeshed eyes;

at least one connecting pin extending through the eyes of said third set of fasteners; and said opposite ends of said belt being without means for structurally interconnecting the same along both said first transition portion and said second transition portion to facilitate free lateral flexure of both said first and second side portions of said belt through the trough zone.

3. A conveyor belt as set forth in claim 2, wherein:

said connecting pin has a longitudinal axis, and is flexible in a plane generally perpendicular to the longitudinal axis of said connecting pin.

4. A conveyor belt as set forth in claim 3, wherein:

said connecting pin is elongated and extends through at least two of said first, second, and third sets of belt fasteners.

5. A conveyor belt as set forth in claim 4, wherein:

said connecting pins extends through each of said first, second, and third sets of belt fasteners.

6. A conveyor belt as set forth in claim 2, including:
first, second, and third connecting pins respectively extending through said first, second, and third sets of said belt fasteners.

7. A conveyor belt as set forth in claim 2, including:
at least one sealing element positioned between the opposite ends of said belt and extending along one of said first and second transition portions of said belt to alleviate material loss.

8. A conveyor belt as set forth in claim 7, including:
a seal mounting element connected with the opposite ends of said belt, and retaining said sealing element therebetween.

9. A conveyor belt as set forth in claim 8, wherein:
said seal mounting element comprises a pair of rigid plates positioned on opposite faces of said belt to capture said sealing element therebetween.

10. A conveyor belt as set forth in claim 8, wherein:
said seal mounting element comprises a mounting eye through which said connecting pin is received.

11. A conveyor belt as set forth in claim 10, wherein:
said sealing element includes a central passageway through which said connecting pin is received.

12. A conveyor belt as set forth in claim 11, wherein:
said sealing element includes slots into which said mounting eye is received.

13. A conveyor belt as set forth in claim 12, wherein:
each of said sealing elements includes a pair of said seal mounting elements retaining the same along the opposite ends of said belt; one of said sealing elements has one end thereof connected to one end of said belt, and the other one of said sealing elements has one end thereof connected to the other end of said belt.

14. A conveyor belt as set forth in claim 13, wherein:
said sealing element has a generally square transverse cross-sectional shape.

15. A conveyor belt as set forth in claim 14, wherein:
said sealing element includes elastically deformable sides facing adjacent edges of the opposite ends of said belt.

16. A conveyor belt as set forth in claim 1, wherein:
said connecting pin has a longitudinal axis, and is flexible in a plane generally perpendicular to the longitudinal axis of said connecting pin.

17. A conveyor belt as set forth in claim 1, wherein:
said connecting pins is elongated and extends through said first and second sets of belt fasteners.

18. A conveyor belt as set forth in claim 1, including:
first, second, and third connecting pins respectively extending through said first, second, and third sets of said belt fasteners.

19. A conveyor belt as set forth in claim 1, including:
at least one sealing element positioned between the opposite ends of said belt and extending along said transition portion of said belt to alleviate material loss.

20. A belt lacing for hingedly interconnecting opposite ends of conveyor belts of the type used in installations having a cupped-shaped trough zone, wherein a center portion of the belt is generally flat and supported in a normally horizontal orientation, at least one side portion of the belt is deformed upwardly from the center portion and supported in a normally vertically inclined orientation, and a transition portion of the belt, disposed between the center portion and the side portion, is generally arcuate and unsupported, comprising:
a first set of belt fasteners adapted for connection to the opposite ends of the belt, and arranged side-by-side along the center portion thereof; said first set of belt fasteners having intermeshed eyes;
a second set of belt fasteners adapted for connection to the opposite ends of the belt, and arranged side-by-side along the side portion thereof; said second set of belt fasteners having intermeshed eyes;
at least one connector pin extending through the eyes of said first set of belt fasteners and said second set of belt fasteners to hingedly interconnect said belt fasteners on the center and side portions of the belt; and
the opposite ends of the conveyor belt being without means for structurally interconnecting the same along the transition portion to facilitate free lateral flexure of the belt through the trough zone.

21. A belt lacing as set forth in claim 20, wherein:
said connecting pin has a longitudinal axis, and is flexible in a plane generally perpendicular to the longitudinal axis of said connecting pin.

22. A belt lacing as set forth in claim 21, wherein:
said connecting pin is elongated and extends through said first and second sets of belt fasteners.

23. A belt lacing as set forth in claim 20, including:
first and second connecting pins respectively extending through said first and second sets of said belt fasteners.

24. A belt lacing as set forth in claim 20, including:
at least one sealing element positioned between the opposite ends of the belt and extending along the transition portion of the belt to alleviate material loss.

25. A belt lacing as set forth in claim 24, wherein:
said sealing element includes a central passageway through which said connecting pin is received.

26. A belt lacing as set forth in claim 25, wherein:
said sealing element includes elastically deformable sides facing adjacent edges of the opposite ends of the belt.

27. A method for hingedly interconnecting opposite ends of a conveyor belt of the type used in installations having a cupped-shaped trough zone, wherein a center portion of the belt is generally flat and supported in a normally horizontal orientation, at least one side portion of the belt is deformed upwardly from the center portion and supported in a normally vertically inclined orientation, and a transition portion of the belt, disposed between the center portion and the side portion, is generally arcuate and unsupported, comprising:
mounting a first set of belt fasteners to the opposite ends of the belt, and arranging the same side-by-side along the center portion thereof; the first set of belt fasteners having eyes;
mounting a second set of belt fasteners to the opposite ends of the belt, and arranging the same side-by-side along the side portion thereof; the second set of belt fasteners having eyes;
intermeshing the eyes of the first and second sets of belt fasteners mounted on the opposite ends of the belt;
inserting at least one connector pin through the intermeshed eyes of the first and second sets of belt fasteners to hingedly interconnect the belt fasteners along the center and side portions of said belt, such that the opposite ends of the belt are without means for structurally interconnecting the same along the transition portion to facilitate free lateral flexure of the belt through the trough zone.

28. A method as set forth in claim 27, wherein:
the belt includes first and second side portions deformed upwardly from opposite sides of the center portion and supported in a normally vertically inclined orientation, and first and second transition portions disposed between the center portion and the first and second side portions respectively, each of which are generally arcuate and unsupported;

the first set of belt fasteners is positioned on the first side portion of the belt; and including mounting a third set of belt fasteners to the opposite ends of said belt, and arranged side-by-side along the second side portion thereof; the third set of belt fasteners having intermeshed eyes;

intermeshing the eyes of the third set of belt fasteners mounted on the opposite ends of the belt;

inserting a connecting pin through the eyes of the third set of fasteners, such that the opposite ends of the belt are without means for structurally interconnecting the same along the transition portions to facilitate free lateral flexure of both said first and second side portions of said belt through the trough zone.

29. A method as set forth in claim 28, wherein:

a single, flexible connecting pin is inserted through the first, second, and third sets of belt fasteners.

30. A method as set forth in claim 28, including:

mounting at least one sealing element between the opposite ends of said belt to extend along the transition portion of the belt to alleviate material loss.

31. A method as set forth in claim 30, including:

inserting the connecting pin through a central passageway in the sealing element.

* * * * *